United States Patent Office 2,892,814
Patented June 30, 1959

2,892,814
POLYPINATES

Walter T. Koch, Drexel Hill, Marion R. Lytton, West Chester, and Edward A. Wielicki, Philadelphia, Pa., assignors to American Viscose Corporation, Philadelphia, Pa., a corporation of Delaware No Drawing. Application December 23, 1954
Serial No. 477,426

6 Claims. (Cl. 260—75)

This invention relates to polymeric materials and more particularly to polyesters prepared from pinic acid.

The forming of polymers by the condensation of a dibasic acid with a diol has been known for some time. U.S. Patent 2,130,523 to Wallace H. Carothers, for example, discloses such condensation products. Some of these polyesters exhibit physical characteristics that make them highly desirable as fiber and film formers.

The object of this invention is to prepare a new and distinctive class of polyesters. Another object is to provide polyesters having exceptional transparency and especially good plasticizing characteristics. A further object is to manufacture products which are useful in the plastic, molding, coating, sizing, adhesive and related arts. Other objects and advantages of the present invention will be obvious from the description which follows.

It has now been discovered that the above objects may be accomplished by reacting pinic acid or a derivative thereof with an organic diol.

Pinic acid has the following structural formula:

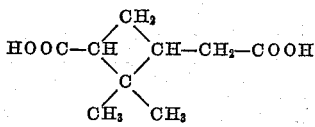

Homopinic acid which is equivalent to pinic acid with respect to the present invention differs from the above formula by a methylene group located between the ring and the secondary carboxyl radical. Examples of other pinic acid derivatives which are also operative include halides such as pinoyl chloride and bromide and esters such as the lower aliphatic esters, e.g., methyl, ethyl and butyl pinate and phenyl pinate.

The organic diols contemplated for use in this invention are represented by the following formula:

HO—R—OH wherein R is a divalent aliphatic or substituted aliphatic hydrocarbon radical containing from 2 to 12 carbon atoms. One or more alicyclic or aromatic groups may be substituted in the aliphatic chain or an aliphatic group for a hydrogen atom therein. Examples of R are as follows:

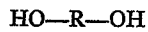

wherein n is an integer from 2 to 12;

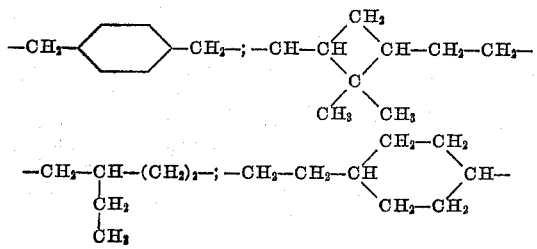

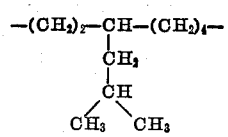

Thus, the polymeric products of the present invention are characterized by having the following recurring structural units:

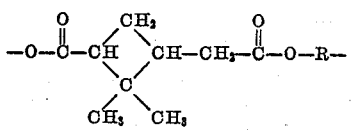

wherein R is the same as defined above.

Polyesters which are the reaction product of 1,1-dimethyl-2-hydroxymethyl-4-(β-hydroxyethyl)-cyclobutane and dibasic organic acids are also contemplated in this invention and the equivalent of those prepared from pinic acid. The diol may be obtained by the hydrogenation of pinic acid or its esters. The acids have the following formula:

$$HO-\overset{O}{\underset{\|}{C}}-R^1-\overset{O}{\underset{\|}{C}}-OH$$

wherein $R^1$ is a divalet aliphatic hydrocarbon radical having from 2 to 12 carbon atoms, e.g. succinic acid and glutaric acid. These polyesters have the following recurring structural units:

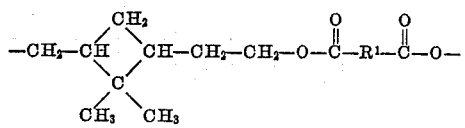

Conventional techniques for effecting polymerization reactions are employed in condensing pinic acid or a derivative thereof with the derivative organic diol. It is preferred to carry out the reaction in the presence of a catalyst consisting of both lead oxide and cobaltous acetate as described in U.S. Patent No. 2,641,592 to Charles H. Hofrichter, Jr. Lead oxide or magnesium ribbon alone are also operative catalysts. From about 0.01% to 1.0% by weight, based on the weight of pinic acid or derivative, will effectively catalyze the reaction. Equal quantities by weight of lead oxide and cobaltous acetate within the aforesaid range are preferred.

The temperature for the polymer producing reactions may vary from about 125° C. to about 300° C. It is preferred that the reaction mixture which includes pinic acid or a derivative, an organic diol and a catalyst, be first heated at a temperature from about 125° C. to 210° C. for from 2 to 20 hours, then the temperature raised to from 200° C. to 275° for from 2 to 16 hours and finally heated at from 250° C. to 300° C. for another 2 to 8 hour period.

A preferred procedure for carrying out the reaction is to continuously bubble nitrogen through the reaction mixture during one or more of the above heating steps. It is also preferred to carry out the final heating step under reduced temperature, i.e., from about 0.2 mm. to about 3 mm.

The products of the present invention which are prepared as described above are highly transparent, non-crystalline polymers having an average molecular weight of at least 1000. To those skilled in the art the essentially non-crystalline polymers are known as "gums" because of their indefinite melting point and tackiness at about room temperature. The polyesters of pinic acid are further characterized in that they are non-volatile and nearly odorless. Therefore, they are extremely useful as non-fugitive low temperature plasticizers for a number of thermoplastic resins including cellulose derivatives such as cellulose acetate, cellulose butyrate and cellulose nitrate, vinyl resins such as polyvinyl chloride and vinylidine chloride, acrylic resins such as acrylonitrile and methacrylonitrile, polyamides such as polyhexamethyleneadipamide and polyester resins such as polyethylene terephathalate. From about 3% to 50% of the polypinates may be admixed with the thermoplastic resins to plasticize the same.

The polyesters of the present invention are also useful as pour-point depressives in motor oil in amounts varying from 1% to 5% by weight.

The following examples illustrate methods of preparing polypinates.

*Example 1*

Polyethylene pinate was prepared by continuously bubbling nitrogen through a mixture which consisted of 12.7 g. diethyl pinate (0.05 mole), 7.0 g. ethylene glycol (0.113 mole), 0.0040 g. cobaltous acetate and 0.0040 g. lead oxide (PbO) and heating the mixture rapidly at 180° C. and maintaining the temperature for 15 hours. The reactants became miscible during the initial heating. The temperature was then increased to 250° C. over a 4.5 hour period and maintained at this temperature while the pressure was gradually reduced to 1.3 mm. over a 2 hour period. The polymerization was continued at 1.1–1.3 mm. for 2 hours at 250° C. The product was very viscous at this temperature and had an amber color. On cooling the polymer, 11 g. of a hard gum was obtained which was soluble in toluene. The gum was triturated with water and then with methanol and finally dried at 80° C. for 3 hours at 1–2 mm. The polymer had a specific viscosity ($\eta_{sp}$) of 0.1141 (as determined at a concentration of 0.5% by weight in toluene of 25° C. This corresponds to an intrinsic viscosity ($\eta_i$) of 0.216 calculated according to the formula:

$$\eta_i = \frac{2.303 \log (\eta_{sp}+1)}{C}$$

The polymer had a calculated molecular weight of 10,674.

*Example 2*

Polyethylene pinate was prepared as follows: Nitrogen was bubbled continuously through a mixture which consisted of 12.4 g. of diethyl pinate (0.051 mole), 6.8 g. ethylene glycol (0.11 mole), 0.0078 g. lead oxide and 0.0090 g. cobaltous acetate as the mixture was heated for 3 hours at 190–195° C. The temperature was raised to 250° C. during an 0.5 hour interval and heating was continued at 250–285° C. for 1.5 hours. The pressure was then reduced to 2 mm. and heating continued for another hour. The product obtained was a hard amber color highly transparent gum weighing 11.5 g. It had an ($\eta_{sp}$) of 0.0708 and an $\eta_i$ of 0.136, determined and calculated as set forth in Example 1.

*Example 3*

12.2 g. of diethyl pinate (0.05 mole), 9.3 g. of ethylene glycol (0.15 mole), 0.0038 g. of cobaltous acetate and 0.0042 g. of lead oxide were mixed together and heated at from 180–195° C. for 8 hours while nitrogen was continuously bubbled through the mixture. The mixture was then heated for 15 hours at 220–225° C. The temperature was subsequently raised to 245° C. over a period of 0.5 hour and heating continued at 245–250° C. for 4 hours. The pressure was then reduced to 1.3 mm. during a 1.5 hour interval and heating was continued at 250–255° C. for another 2.5 hours at a pressure of 1.3 mm. The product, polyethylene pinate, weighed 11.5 g. and was a hard transparent gum. This polymer had a $\eta_{sp}$ of 0.0250 (as determined at a concentration of 0.1% by weight in toluene at 25° C.), and a calculated $\eta_i$ of 0.246.

*Example 4*

Polyethylene pinate was prepared by mixing together 12.2 g. of diethyl pinate (0.05 mole), 6.8 g. of ethylene glycol (0.11 mole) and 0.80 g. of acid washed magnesium ribbon. The mixture was heated for 20 hours at 180–190° C. and then at 240–260° C. for 6 hours while nitrogen was continuously bubbled through the mixture. It was then heated at 250–260° C. for 1 hour at a pressure of 1.9–2.6 mm. and finally at 270–290° C. for another hour at the same pressure. The product weighed 10.1 g. and was a light amber colored transparent gum. The polymer had an $\eta_{sp}$ of 0.0658 and and $\eta_i$ of 0.132 determined and calculated in the same manner as in Example 1.

*Example 5*

The same reactants as in Example 2 were mixed together except that 0.0098 g. of lead oxide was substituted for the cobaltous acetate and lead oxide. The same process described in Example 2 was effected with the mixture. The product, polyethylene pinate, was a light amber colored transparent gum and had an $\eta_i$ of 0.114.

*Example 6*

Polytetramethylene pinate was prepared by mixing together 12.2 g. of diethyl pinate (0.05 mole), 9.5 g. of 1,4 butanediol (0.11 mole), 0.0050 g. of cobaltous acetate and 0.0050 g. of lead oxide. The mixture was heated at 170–180° C. for 21 hours. The temperature was then raised to 245° C. over a 1.5 hour interval and heating continued at 245–250° C. for 1.5 hours. The pressure was greatly reduced to 5 mm. over a 2 hour interval and heating then continued at 250–255° C. for 3 hours at 1.3–5 mm. Nitrogen was continuously bubbled through the mixture during each of the above heating steps. The product was a nearly colorless transparent gum and weighed 11.5 g. The specific viscosity of the polymer was 0.1338 as determined at a concentration of 0.5% by weight in toluene at 25° C. The intrinsic viscosity was calculated to be 0.251.

*Example 7*

7.3 g. of diethyl pinate (0.03 mole), 8.3 g. of p-xylylene glycol (0.06 mole), 0.0040 g. of cobaltous acetate and 0.0040 g. of lead oxide were mixed together and heated at 185–190° C. for 16 hours and then at 190–245° C. for 3.5 hours. The pressure was then reduced to 2.8–1.6 mm. and the heating continued at 240–250° C. for 4 hours. Nitrogen was continuously bubbled through the mixture during all of the above heating steps. The product, the polyester of p-xylylene glycol and pinic acid, was a viscous yellow green transparent gum which weighed 10.5 g. and had a minimum intrinsic viscosity of 0.09.

*Example 8*

Polyethylene homopinate was prepared by mixing together 11.6 g. of dimethyl homopinate (0.051 mole), 6.7 g. ethylene glycol (0.108 mole), 0.0048 g. of lead oxide and 0.0055 g. of cobaltous acetate. The mixture was heated at 190–195° C. for 15 hours, for 2.5 hours at 195–240° C. and at 240–268° C. for 4.5 hours. The pressure was then reduced to 5.2–0.9 mm. and the heating continued for 1 hour at this pressure. Nitrogen was continuously bubbled through the mixture in each of the above heating steps. The product weighed 11.0 g. and was a hard amber colored transparent gum. It had an $\eta_{sp}$ of 0.189 and an $\eta_i$ of 0.346 as determined and calculated in the manner set forth in Example 1.

*Example 9*

Polytetramethylene homopinate was prepared by mixing together 11.4 g. of dimethyl homopinate (0.05 mole), 10.8 g. 1,4-butanediol (0.12 mole), 0.0060 g. of cobaltous acetate and 0.0060 g. of lead oxide and heating the mixture for 16 hours at 190–195° C. The mixture was further heated at 195–290° C. for 1 hour and at 240–

255° C. for 3.5 hours. The pressure was then reduced to 4.4–1.7 mm. and the heating continued for 2 hours at 255–265° C. Nitrogen was continuously bubbled through the reaction mixture during each of the above heating steps. The product was a light amber colored transparent gum. It had an $\eta_{sp}$ of 0.140 (determined at 0.5% by weight concentration in toluene) and a calculated $\eta_i$ of 0.262.

*Example 10*

10.2 g. of 1,1-dimethyl-2-hydroxymethyl-4-($\beta$-hydroxyethyl)-cyclobutane (0.065 mole), 5.1 g. of diethyl succinate (0.03 mole), 0.0055 g. of cobaltous acetate and 0.3 g. of acid washed magnesium ribbon were mixed together and the mixture heated at 140–205° C. for 3.5 hours and at 205–260° C. for 2 hours. The mixture was further heated at 260–270° C. at 0.6–1.2 mm. for 2 hours. Nitrogen was continuously bubbled through the mixture during each of the above heating steps. The product, the succinate polyester of 1,1-dimethyl-2-hydroxymethyl-4-($\beta$-hydroxyethyl)-cyclobutane, was an amber colored transparent gum. This product was dissolved in 40 ml. of carbon tetrachloride and precipitated with 120 ml. of ethanol. The oily lower layer was washed with ethanol and then dried.

*Example 11*

The pinate polyester of 1,1-dimethyl-2-hydroxymethyl-4-($\beta$-hydroxyethyl)-cyclobutane was prepared by mixing together 14.2 g. of the diol (0.09 mole), 6.10 g. of diethyl pinate (0.025 mole), 0.0065 g. of cobaltous acetate and 0.0065 g. of lead oxide. The mixture was heated at 170–180° C. for 20 hours. The temperature was then rapidly raised to 255° C. and heating continued for 3 hours at 255–270° C. The pressure was then reduced to 0.5–1.2 mm. and the heating continued for 3 hours at 260–270° C. Nitrogen was continuously bubbled through the reaction mixture in each of the above heating steps. Product was a tacky slightly colored transparent gum.

Samples of some of the polypinates were incorporated into a nitrocellulose lacquer which consisted of 100 parts of nitrocellulose and 35 parts of sample. This lacquer was then applied to regenerated cellulose films which were about 0.9 mil in thickness. A lacquer consisting of nitrocellulose without a plasticizer and a lacquer containing 35 parts of methyl paratoluene sulfonamide, a common commercially available plasticizer, with 100 parts of nitrocellulose were also prepared and applied to regenerated cellulose films of the same thickness. Comparative results with respect to moisture vapor transmission rates of the above described coated films are indicated in the table below:

| Sample [2] | MVTR [1] (g./m.²/24 hr.) 1st 48 hrs. | MVTR [1]/ mil, 2nd 48 hrs. | | Percent decrease in MVTR compared to nitro cellulose for 2nd period |
|---|---|---|---|---|
| 100% | 565 | 514 | 88 | 0 |
| No. 70 Polyethylene Pinate | 313 | 308 | 52 | 40 |
| No. 66 Polytetramethylene Pinate | 322 | 299 | 51 | 42 |
| No. 109 Polyester of Succinic acid and 1-1-dimethyl-2-hydroxymethyl-4-($\beta$-hydroxyethyl)-cyclobutane | 312 | 297 | 51 | 42 |
| Methyl Paratoluene Sulfonamide | 397 | 353 | 60 | 32 |

[1] (a) Moisture vapor transmission rate.
[2] (b) The films were 0.17 ±0.02 mil in thickness.

The results in the above table demonstrate the effectiveness of the polypinates as plasticizers for nitrocellulose coatings in decreasing the moisture vapor transmission rate.

It is to be understood that the aforegoing examples and description are merely illustrative and that changes and variations may be made therein without departing from the spirit and scope of the invention as defined by the appended claims.

We claim:
1. Resinous homo-polyesters of an organic diol containing 2 to 12 carbon atoms and a compound selected from a group consisting of pinic acid and homopinic acid.
2. Resinous homo-polyethylene pinate.
3. Resinous homo-polytetramethylene pinate.
4. The resinous homo-polyester of p-xylylene glycol and pinic acid.
5. Resinous homo-polyethylene homopinate.
6. Resinous homo-polytetramethylene homopinate.

References Cited in the file of this patent

UNITED STATES PATENTS

| 2,180,418 | James | Nov. 21, 1939 |
| 2,650,211 | Dannenberg et al. | Aug. 25, 1953 |
| 2,650,213 | Hofrichter | Aug. 25, 1953 |
| 2,682,513 | Skeist | June 29, 1954 |
| 2,687,387 | Olson | Aug. 24, 1954 |
| 2,750,411 | Fisher et al. | June 12, 1956 |

OTHER REFERENCES

Murphy et al.: Pinic Acid Diesters, Industrial and Engineering Chemistry, vol. 45, No. 1, January 1953 (pages 119–124). (Copy in Scientific Lib.).

Stinson et al.: Synthesis of Sym-Homopinic Acid, Journal of Organic Chemistry, vol. 19, No. 7, July 1954. (Copy in Scientific Lib.) (Pages 1047–1052.)

UNITED STATES PATENT OFFICE

Certificate of Correction

Patent No. 2,892,814

June 30, 1959

Walter T. Koch et al.

It is hereby certified that error appears in the printed specification of the above numbered patent requiring correction and that the said Letters Patent should read as corrected below.

Column 1, lines 63 to 67, the right-hand portion of the formula after the semi-colon should appear as shown below instead of as in the patent:

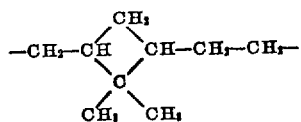

column 2, line 54, for "275° for" read —275° C. for—; column 6, in the table, first column thereof, under the heading "Sample 2", first line, after "100%" insert —Nitrocellulose—.

Signed and sealed this 26th day of April 1960.

[SEAL]

Attest:
KARL H. AXLINE,
Attesting Officer.

ROBERT C. WATSON,
Commissioner of Patents.